April 22, 1947. A. SCHMIDT, JR 2,419,464
ELECTRONIC POWER CONVERSION APPARATUS
Filed June 12, 1944
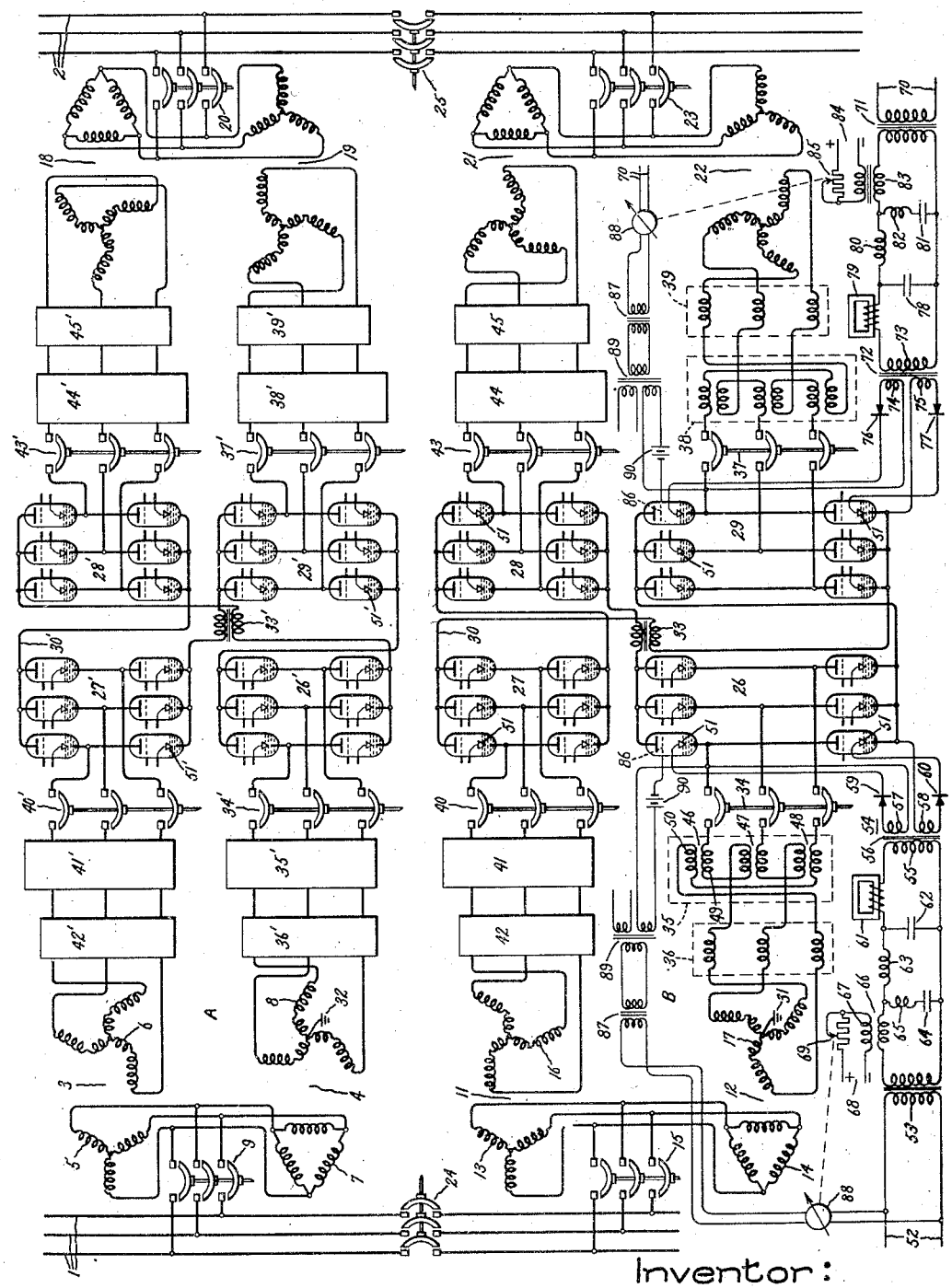
Inventor:
August Schmidt, Jr.,
by Harry E. Dunham
His Attorney.

Patented Apr. 22, 1947

2,419,464

UNITED STATES PATENT OFFICE 2,419,464

ELECTRONIC POWER CONVERSION APPARATUS

August Schmidt, Jr., Niskayuna, N. Y., assignor to General Electric Company, a corporation of New York Application June 12, 1944, Serial No. 539,939

9 Claims. (Cl. 171—97)

My invention relates to electronic power conversion apparatus and more particularly to electronic apparatus for converting alternating current power from one frequency to alternating current power of the same or of a different frequency.

The electronic power conversion system of my present invention is of the type known in the art as a dual conversion system wherein alternating current of one frequency is rectified by electronic rectifying apparatus transmitted as direct current over a high voltage direct current transmitting circuit and then inverted by electronic means to alternating current of the same or of a different frequency. Such apparatus may be used to interconnect two electrical systems, and may be classified as a tie line, a frequency converter, or a direct current power transmission system, depending upon the principal function performed by the apparatus.

In systems of this type requiring outputs in the thousands of kilowatts, it is found expedient, in view of the present current and voltage rating of electronic tubes, to utilize a plurality of rectifiers and inverter units. Heretofore, the rectifier units have been connected in series, and likewise the inverter units, with the direct current loop interconnecting the two series connected groups of conversion apparatus. With this arrangement the voltage level and insulation stresses of the system are greater than is desired, the flexibility in utilization of the various units is not adequate for many purposes, and reduction in communication interference is not readily obtained.

It is, therefore, an object of my invention to provide a new and improved arrangement for electronic power conversion apparatus.

It is another object of my invention to provide a new and improved arrangement for a plurality of electronic power rectifiers and inverters so as to reduce the voltage level and the insulation stress of the system appreciably below that experienced in the arrangements heretofore proposed or used as referred to above.

It is a further object of my invention to provide a new and improved arrangement of a plurality of power rectifiers and inverters which affords flexibility in utilization of the several units whereby separate and independent operation of a portion of the units may be obtained as well as joint operation of all units.

It is a still further object of my invention to provide a new and improved arrangement in electric power conversion apparatus for effecting phase multiplication and thereby minimizing interference with communication circuits.

My invention will be better understood from the following description taken in connection with the accompanying drawing and its scope will be pointed out in the appended claims.

The single figure of the accompanying drawing is a diagrammatic representation of one embodiment of my invention particularly arranged for a double-unit power conversion unit.

In the single figure of the accompanying drawing, I have represented two alternating current power systems 1 and 2 which, by way of example, will be assumed to be 60 cycles and 25 cycles, respectively. With this assumption the electronic conversion apparatus may be referred to as a frequency changer although it will be obvious to those skilled in the art that my system is equally applicable to a high voltage, direct current transmission, a tie line, or various other conversion functions. For simplicity of identification the top unit, as viewed in the drawing, is designated as A and the bottom unit as B. Unit A is connected to the alternating current system 1 through two transformers 3 and 4. Transformer 3 comprises a Y-connected primary winding 5 and a secondary winding 6 which is zigzagged for a phase displacement of plus 7½ electrical degrees. Transformer 4 comprises a delta connected primary winding 7 and a secondary winding 8 similarly zigzagged for a phase displacement of plus 7½ electrical degrees. The primary windings 5 and 7 are connected in parallel and to the circuit 1 through a circuit interrupting device 9. Since double-way rectification, to be described presently, is used a 12 phase wave form is obtained by using the two three phase secondary windings displaced thirty electrical degrees. Unit B is similarly connected to the circuit 1 through transformers 11 and 12 which are provided with Y and delta connected primary windings 13 and 14, respectively, connected in parallel and to the circuit 1 through the circuit interrupter 15. Transformers 11 and 12 are also provided with zigzagged secondary windings 16 and 17, respectively. Each of these secondary windings is zigzagged for a phase displacement of minus 7½ electrical degrees.

Unit A is also connected to circuit 2 through transformers 18 and 19 which are arranged similarly to transformers 3 and 4 for 12-phase operation and connected to circuit 2 through circuit interrupting means 20. Unit B is likewise connected to circuit 2 through transformers 21 and 22 arranged similarly to transformers 11 and 12 for 12-phase operation and connected to circuit 2 through circuit interrupting means 23. Each of the secondary windings of transformers 18 and 19 is zigzagged 7½ plus while the secondary windings of transformers 21 and 22 are zigzagged 7½ minus. Thus by connecting all of the transformer secondary windings of unit A 7½ degrees plus, or leading, and the secondary windings of unit B 7½ degrees minus, or lagging, an overall 24-phase relationship is obtained when both units are being operated.

Sectionalizing switches 24 and 25 may be interposed in circuits 1 and 2, respectively, between units A and B.

Each of the converter units A and B is shown as comprising four tube groups which are similar in arrangement in the two units, and for purposes of simplicity in explanation the detailed description will be directed more particularly to the power portion, as viewed in the drawing, of the unit B. The unit B comprises four tube groups 26, 27, 28 and 29. Tube groups 26 and 27 may be considered as rectifiers and tube groups 28 and 29 as inverters, or vice versa, depending upon the assumed direction of power flow. Each tube group comprises six tubes connected in a three-phase double-way circuit as shown, for example, in tube group 26, in which tubes 180 degrees apart in phase position are mounted back to back with the cathode of the upper tube connected to the anode of the tube below it. This three-phase double-way circuit is a desirable arrangement because of its high apparatus economy and good operating characteristics. In accordance with my invention, the tube groups 26, 27, 28 and 29 are connected in an alternate arrangement such that, with the assumption that tube groups 26 and 27 are rectifiers and tube groups 28 and 29 are inverters, the direct current loop circuit 30 may be traced from the lower direct current terminal of rectifier tube group 27 to the upper direct current terminal of inverter tube group 28, from the lower direct current terminal of inverter tube group 28 to the upper direct current terminal of rectifier tube group 26, from the lower direct current terminal of rectifier group 26 to the upper direct current terminal of inverter tube group 29, and from the lower direct current terminal of inverter tube group 29 and back to the upper direct current terminal of rectifier tube group 27; thus closing the direct current loop through the tube groups. Briefly stated, the circuit proceeds from rectifier 27 to inverter 28, to rectifier 26, to inverter 29 and back to rectifier 27. With this alternate arrangement of the tube groups associated with the respective alternating current circuits 1 and 2, the voltage level in the direct current loop 30 is minimized because the contiguous tube groups function oppositely at all times—one serving as a rectifier to produce a unidirectional voltage and the other serving as an inverter to absorb the unidirectional voltage. In accordance with my invention, the neutral terminal of a transformer secondary of each converter unit, such as the neutral terminal of transformer winding 17 of unit B and the neutral terminal of transformer secondary winding 8 of unit A are grounded at points 31 and 32, respectively. With this grounding, the insulation stress of the transformer secondary windings and the direct current loop is further reduced. The alternate connection of rectifier tube groups and inverter tube groups and the grounding, as specified, results in reducing the insulation stress to only one-half the direct voltage of one tube group, although the effective operation voltage is twice the direct voltage of one tube group.

The tube groups of unit A corresponding to those of unit B have been assigned the same reference numeral with a prime mark for ease of identification. These tube groups are connected in an alternate arrangement in the same manner as has been described in connection with unit B.

One double winding, direct current reactor 33 is connected in the direct current loop 30 of unit B and similarly a double winding direct current reactor 33' is connected in the direct current loop 30' of unit A. Each direct current reactor may be regarded as an infinite inductance suppressing substantially all ripple in the direct current.

Each tube group is connected to its associated transformer secondary winding through a circuit interrupting means such as a disconnect switch, a commutating reactor and a current limiting reactor. Thus tube group 26 of unit B is connected to transformer secondary winding 17 through a disconnect switch 34, a commutating reactor 35 and a current limiting reactor 36. In like manner, the tube group 29 is connected to the secondary winding of transformer 22 through a disconnect switch 37, a commutating reactor 38 and a current limiting reactor 39. Tube group 27 of unit B is connected to secondary winding 19 through a disconnect switch 40, a commutator reactor 41 and a current limiting reactor 42. Tube group 28 of unit B is connected to the secondary winding of transformer 21 through a disconnect switch 43, a commutating reactor 44 and a current limiting reactor 45. The commutating reactors 41 and 44 and 42 and 45 are each represented by a rectangular outline and are intended to represent the diagrammatic arrangement shown for the corresponding elements 35 and 36. Similar rectangular outlines having the same significance are shown with the other tube groups of circuit A wherein the same reference numerals, which are primed, have been used to designate corresponding elements.

The commutating reactor 35 and the other corresponding commutating reactors are utilized to suppress or substantially reduce arc-back conditions and are of a type described and claimed in U. S. Letters Patent No. 2,126,603, granted August 8, 1938, upon an application of B. D. Bedford and assigned to the assignee of the present application. The commutating reactor 35 comprises three saturable reactor elements 46, 47 and 48, each including a core member or winding 49 and a control winding 50. The windings 49 are utilized to control the rate of change of current through the associated valves near the end of the conducting periods, and the inductance of the windings 49 is controlled by the control windings 50. It will be noted that the series winding 49 of reactor 46 is connected in series relation with control winding 50 of reactor 46. The core member of reactor 46 is controlled in accordance with the current of this phase of the polyphase system. By this arrangement each reactor element is saturated prior to and during the greater part of the conducting period of its associated electric valve and offers a relatively small inductive reactance to the flow of current. On the other hand, the control winding effects a substantial increase in the series winding near or at the end of the conducting periods so that the rate of change of current through the electric valve means is reduced below a predetermined value so that positive ions associated with the ion plasma within the electric valve are allowed a sufficient time to diffuse within the valve without establishing high voltage gradients conducive to arc-backs. The current limiting reactors 36 and the other corresponding current limiting reactors are provided to limit the fault currents during arc-back or a short circuit on the direct current loop 30.

Each tube of the several tube groups is furnished with an appropriate excitation circuit. The arc initiating means is indicated by the ignitor element 51 in each tube which is arranged to control the point of initiation of the arc in the appropriate half cycle of the respective tubes in the proper order. The energizing circuit for the various ignitors may be any of the several types well known in the art. I have illustrated the tubes as being of the ignitron type because this type of tube has suitable characteristics for heavy power projects, although it will be evident that my invention is not limited to a particular type of electronic tube. With tubes of the ignitor type a suitable excitation circuit is of the type described and claimed in application Serial No. 413,232, of A. H. Mittag, filed October 1, 1941, and assigned to the assignee of this application. This circuit is of the so-called magnetic type and, as illustrated, comprises an auxiliary source of alternating current 52 connected to energize an excitation transformer 53 which is utilized to transmit unidirectional impulses of current of peaked wave form to the ignitor control members 51 and cause arcs to be initiated in these tubes alternately during intervals of time displaced substantially 180 electrical degrees. The ignitors 51 are connected through an insulating transformer 54 having a primary winding 55, a core 56 and a pair of secondary windings 57 and 58. The insulating transformer is used to transform the ignitor peaks up to the high potential level of the tubes. Unidirectional conducting devices 59 and 60 are connected in circuit with the respective ignitors 51. The primary winding 55 is connected to be energized from the source 52 through a nonlinear reactance or firing reactor 61 and a shunt connected capacitance 62, which elements in combination cause a peak of voltage to be generated across transformer 54. The firing circuit also includes a linear reactance 63 connected between the capacitor 62 and transformer 53 and which serves to prevent discharge of the capacitance to the supply circuit upon saturation of the firing reactor 61. This linear reactor also serves to limit the current derived from the supply circuit at the time capacitance 62 discharges through transformer winding 55. The circuit may also be provided with an additional shunt connected compensating circuit comprising a capacitance 64 connected in series with a linear reactor 65 across the supply circuit to maintain the voltage applied to the firing capacitance 62 substantially constant for a predetermined range of phase displacements of the voltage of the firing circuit with respect to the supply circuit voltage. A phase shifting circuit, many satisfactory types of which are available in the art, is used for adjusting the point of arc ignition of the respective valves. For purposes of simplicity, I have shown, as representative of a phase shift circuit, a saturable reactor 66 which is provided with a direct current saturating winding 67 arranged to be energized from a direct voltage source 68 through an adjustable resistor 69. A similar arc ignition circuit is indicated for the group of tubes associated with circuit 2 and a pair of tubes of the tube group 29 has been selected by way of example. The circuit comprises similar elements in the same circuit relationship as that shown for tube group 26 and includes a source of excitation 70, excitation transformer 71, insulating firing transformer 72 with its primary 73 and two secondary windings 74 and 75 which are connected to the ignitors 51 of the oppositely connected valves through contact rectifiers 76 and 77. The primary winding 73 is energized from a firing capacitor 78 through a firing reactor 79. A current limiting reactor 80 and voltage compensating shunt circuit capacitor 81 and reactor 82 are connected and operate as the corresponding elements 63, 64 and 65 of the rectifying circuit. A phase shifting means is indicated by the saturable reactor 83 in which the D.-C. winding thereof is energized from a direct current source 84 through an adjustable resistor 85.

Since either end of the system is intended to be operated at will as a rectifier or inverter, it is desirable to utilize a control electrode or grid in each tube to determine the time of starting of conduction between anode and cathode and also to reduce the deionization period at the end of conduction. I have indicated a control electrode or grid 86 in each tube and have also indicated diagrammatically a grid excitation circuit for each tube group comprising an excitation transformer 87 connected to be energized from the auxiliary source 52 or 70 through a suitable phase shifting device 88. The transformer 87 may be of the peaking type. The grids 86 are connected through an insulating transformer 89 in order to transform the firing peaks up to the higher potential of the tubes. A grid bias source is indicated by the bias battery 90. The particular type of grid excitation circuit forms no part of my present invention and various types known in the art may be used to carry out my invention; however, reference is made to a particularly suitable grid excitation circuit which has been found to operate satisfactorily in this system. Such an excitation circuit is described and claimed in an application Serial No. 539,941, of B. D. Bedford, filed concurrently herewith and assigned to the assignee of the present application. The phase shifters 66 and 83 of the ignitor circuits and the phase shifters 88 of the grid excitation circuits are tied together as indicated by the dotted lines in order to control the magnitude and direction of power flow between the circuits 1 and 2.

It is to be understood that each of the tubes or tube groups will be furnished with suitable arc ignition and grid control circuits such as have been indicated diagrammatically for the single pair of tubes of the rectifier element 26 and inverter element 29 of unit B, and that these circuits will be connected to the respective ignitors and grids as indicated in a manner to effect the proper sequence of firing of the several tubes, as is well understood by those skilled in the art.

The general operation of the system illustrated is substantially as follows: It will be assumed for the moment that unit B is being operated separately. Disconnect switches 34, 37, 40 and 43 would be closed and circuit interrupters 15 and 23 would also be closed. Under the functions assumed for the respective tube groups, tube groups 26 and 27 will be arranged to operate as rectifiers and tube groups 28 and 29 as inverters. In this event, circuit 1 is the supply circuit and circuit 2 the receiving circuit so that power flow is from circuit 1 to circuit 2. Initially, the respective rectifier and inverter firing points are adjusted by phase shifters 68, 83 and 88 so that the rectifier voltage is equal to the inverter counter direct current voltage. Current and therefore power flows through the direct current loop 38 when anything tends to raise the rectifier voltage above the inverter counter voltage. By varying the angle of phase excitation of either the rectifier or the inverter, the magnitude as well as the direction of power flow may be readily controlled. In the initial setting the rectifier firing circuits are retarded in phase, depending upon the magnitude of the supply voltage, and the inverter firing circuits are advanced in phase. As the phase of the rectifier firing circuit is advanced, the power flows from the circuit 1 to circuit 2 and the phase of the rectifier firing circuit is thereafter controlled to maintain the desired load. The phase angle of the inverter firing circuit should also be varied to maintain a safe margin or deionization angle. When changing the pairs of tube groups from rectifier to inverter operation for reverse power flow, the phase position of the firing circuit voltage must be shifted approximately 150 electrical degrees. These functions may be performed by the phase shift means of the respective tube groups which in this case are diagrammatically represented by the phase shifters 68, 83 and 88.

While I have shown a particular embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a pair of alternating current circuits, a plurality of electronic tube groups, means for interconnecting certain of said plurality of electronic tube groups with one of said alternating current circuits, means for interconnecting the remainder of said plurality of electronic tube groups with the other circuit of said pair of alternating current circuits, and means including a loop circuit for connecting the respective tube groups in a series circuit arrangement in which the tube groups associated with one of said alternating current circuits are arranged alternately with tube groups associated with the other of said pair of alternating current circuits.

2. In combination, a pair of polyphase alternating current circuits, a plurality of electronic tube groups each connected for polyphase full wave power conversion, transforming means for interconnecting one half of said electronic tube groups with one of said alternating current circuits, a second transforming means for interconnecting the other half of said plurality of tube groups with the other circuit of said pair of circuits, and means including a loop circuit for connecting the respective tube groups in a series circuit arrangement in which the respective tube groups associated with one of said alternating current circuits are arranged alternately with the respective tube groups associated with the other of said pair of alternating current circuits.

3. In combination, a pair of alternating current circuits, a plurality of electronic tube groups, means for interconnecting one half of said electronic tube groups with one of said alternating current circuits in a manner to constitute a plurality of electronic rectifiers, means for interconnecting the other half of said electronic tube groups with the other of said pair of alternating current circuits in a manner to constitute a plurality of electronic inverters, and means including a direct current loop circuit for connecting the respective rectifiers and inverters in series relation and arranged alternately in said loop circuit.

4. In combination, a pair of alternating current circuits, a plurality of electronic tube groups, transforming means having a secondary winding with a neutral terminal for interconnecting one half of said electronic tube groups with one of said alternating current circuits in a manner to constitute a plurality of electronic rectifiers, transforming means having a secondary winding with a neutral terminal for interconnecting the other half of said electronic tube groups with the other of said pair of alternating current circuits in a manner to constitute a plurality of electronic inverters, means including a direct current loop circuit for connecting the respective rectifiers and inverters alternately in a series circuit arrangement, and means for grounding the neutral terminal of the secondary winding of one of said transforming means.

5. In combination, a pair of three phase alternating current circuits, a plurality of electronic tube groups, means for connecting one half of said plurality of tube groups as full wave rectifiers for twelve phase operation and including transforming means connected to said rectifier tube groups and having delta and Y connected primary windings connected to one of said alternating current circuits and a pair of secondary windings zigzagged for a phase displacement of seven and one-half degrees, means for connecting the other half of said plurality of tube groups as full wave inverters for twelve phase operation and including transforming means connected to said inverter tube groups and having delta and Y connected primary windings connected to the other of said alternating current circuits and a pair of secondary windings zigzagged for a phase displacement of seven and one-half degrees, and means including a direct current loop circuit for connecting the direct current terminals of the respective rectifier and inverter tube groups alternately in a series circuit arrangement.

6. In combination, a pair of three phase alternating current circuits, two units of a plurality of electronic tube groups, transforming means for connecting one half of said plurality of tube groups of one of said units as full wave rectifiers for twelve phase operation, transforming means for connecting the other half of said plurality of tube groups of said one unit as full wave inverters for twelve phase operation, transforming means having a fifteen degree displacement relative to said first mentioned transforming means for connecting one half of said plurality of tube groups of the other of said units as full wave rectifiers for twelve phase operation, transforming means having a fifteen degree displacement relative to said second mentioned transforming means for connecting the remaining half of said plurality of tube groups of the other of said units as full wave inverters for twelve phase operation, and means for selectively connecting and disconnecting said units for operation separately as a twelve phase system or jointly as a twenty-four phase system.

7. In combination, a pair of three phase alternating current circuits, two units of a plurality of electronic tube groups, means for connecting one half of said plurality of tube groups of one of said units as full wave rectifiers for twelve phase operation and including transforming means connected to said rectifier tube groups and having delta and Y connected primary windings connected to one of said alternating current circuits and a pair of secondary windings zigzagged for a leading phase displacement of seven and one-half degrees, means for connecting the remaining half of said plurality of tube groups of the said one of said units as full wave inverters for twelve phase operation and including transforming means connected to said rectifier tube groups and having delta and Y connected primary windings connected to the other of said alternating current circuits and a pair of secondary windings zigzagged for a leading phase displacement of seven and one-half degrees, means for connecting one half of said plurality of tube groups of the other of said units as full wave rectifiers for twelve phase operation and including transforming means connected to said second mentioned rectifier groups and having delta and Y connected primary windings connected to said one of said alternating current circuits and a pair of secondary windings zigzagged for a lagging phase displacement of seven and one-half degrees, means for connecting the remaining half of said plurality of tube groups of the other of said units as full wave inverters for twelve phase operation and including transforming means connected to said second mentioned inverter groups and having delta and Y connected primary windings connected to the other of said alternating current circuits and a pair of secondary windings zigzagged for a lagging phase displacement of seven and one-half degrees, means including a direct current loop circuit associated with each of said units for connecting the respective rectifiers and inverters of each unit alternately in a series circuit arrangement, and means for selectively connecting and disconnecting said units for operation separately as a twelve phase system or jointly as a twenty-four phase system.

8. In combination, a pair of alternating current circuits, a plurality of electronic tube groups, means for interconnecting certain of said plurality of electronic tube groups with one of said alternating current circuits, means for interconnecting the remainder of said plurality of electronic tube groups with the other circuit of said pair of alternating current circuits, means including a loop circuit for connecting the respective tube groups in a series circuit arrangement in which tube groups associated with one of said alternating current circuits alternate with tube groups associated with the other of said pair of alternating current circuits, and means for controlling the amount of power interchanged between said alternating current circuits.

9. In combination, a pair of alternating current circuits, a plurality of electronic tube groups, transforming means for interconnecting one half of said plurality of tube groups with one of said alternating current circuits for operation as rectifiers, transforming means for interconnecting the remainder of said plurality of electronic tube groups with the other circuit of said pair of alternating current circuits for operation as inverters, means including a loop circuit for interconnecting the direct current terminals of said electronic tube groups in a series circuit arrangement in which tube groups associated with one of said alternating current circuits alternate with tube groups associated with the other of said pair of alternating current circuits, and excitation control means connected to the tubes of each tube group for selectively determining and controlling the direction and magnitude of the power interchanged between said alternating current circuits.

AUGUST SCHMIDT, Jr.

REFERENCES CITED

The following references are of record in the file of this patent:

UNITED STATES PATENTS

| Number | Name | Date |
|---|---|---|
| 2,013,454 | Willis | Sept. 3, 1935 |